(12) United States Patent
Krywitsky

(10) Patent No.: US 9,759,339 B2
(45) Date of Patent: Sep. 12, 2017

(54) SAFETY ISOLATION PLUG FITTINGS AND METHODS OF USE

(71) Applicant: Safe Effective Technologies, Inc., Calgary (CA)

(72) Inventor: Lee A. Krywitsky, Calgary (CA)

(73) Assignee: Safe Effective Technologies, Inc., Calgary, Alberta (CA)

( * ) Notice: Subject to any disclaimer, the term of this patent is extended or adjusted under 35 U.S.C. 154(b) by 0 days.

(21) Appl. No.: 14/207,295

(22) Filed: Mar. 12, 2014

(65) Prior Publication Data

US 2014/0261776 A1 Sep. 18, 2014

Related U.S. Application Data

(60) Provisional application No. 61/794,850, filed on Mar. 15, 2013.

(51) Int. Cl.
| | |
|---|---|
| *F16K 17/00* | (2006.01) |
| *F16K 43/00* | (2006.01) |
| *F16L 55/10* | (2006.01) |

(52) U.S. Cl.
CPC ............ *F16K 17/00* (2013.01); *F16K 43/001* (2013.01); *F16L 55/10* (2013.01); *Y10T 137/7722* (2015.04)

(58) Field of Classification Search
CPC .................................. F16K 17/00; F16L 55/10
USPC ......... 137/377, 455, 557, 522; 251/319–323, 251/118, 213, 514, 210, 353, 354
See application file for complete search history.

(56) References Cited

U.S. PATENT DOCUMENTS

| | | | | |
|---|---|---|---|---|
| 218,698 | A * | 8/1879 | Beardsley | 222/514 |
| 1,223,345 | A * | 4/1917 | Norwalk | F16K 15/20 137/232 |
| 2,233,173 | A * | 2/1941 | McCoy | 152/429 |
| 2,294,499 | A | 9/1942 | Henkell et al. | |
| 2,577,654 | A * | 12/1951 | Gates | F24D 19/086 251/322 |
| 2,631,607 | A * | 3/1953 | Keller | 137/494 |
| 2,640,529 | A * | 6/1953 | MacGlashan, Jr. | 137/68.23 |
| 3,239,192 | A * | 3/1966 | Totten | A01K 13/003 119/662 |
| 3,876,178 | A * | 4/1975 | Mainer | F16K 31/62 251/295 |
| 4,136,560 | A * | 1/1979 | Gellos | 73/146.8 |
| 4,831,957 | A * | 5/1989 | Goans | 116/272 |
| 5,853,071 | A * | 12/1998 | Robinson | B60T 11/30 188/352 |

(Continued)

*Primary Examiner* — Craig Schneider
*Assistant Examiner* — Angelisa L Hicks
(74) *Attorney, Agent, or Firm* — Workman Nydegger

(57) ABSTRACT

A safety isolation plug fitting for detecting pressurized fluid in a pipe may include a body defining an inlet adapted to be in fluid communication with the pipe, an outlet, and a passageway extending between the inlet and the outlet. A valve assembly may be seated in the passageway and movable between a closed position in which fluid communication between the inlet and the outlet is inhibited, and an open position in which a pressurized fluid in the pipe can flow between the inlet and the outlet. A flow deflector can be in fluid communication with said outlet that is configured to redirect at least a portion of the pressurized fluid exiting said outlet in direction away from a user.

21 Claims, 9 Drawing Sheets

(56) References Cited

U.S. PATENT DOCUMENTS

2002/0153045 A1* 10/2002 Beyrak ............... F16K 11/0716
                                                    137/554
2013/0233563 A1    9/2013 Bussear

* cited by examiner

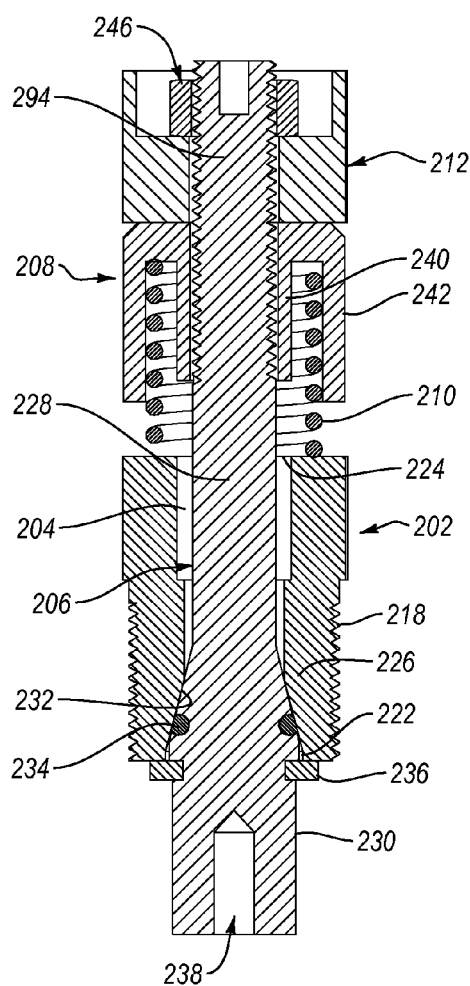
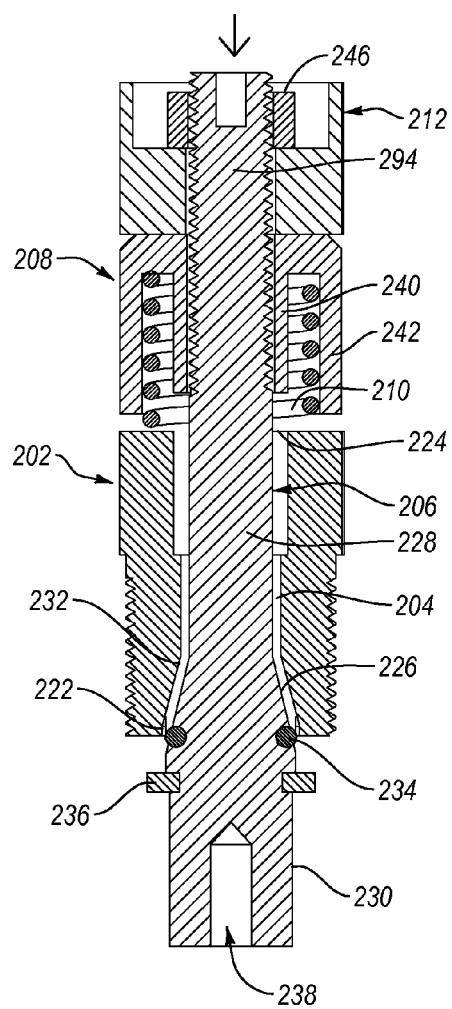
FIG. 4
FIG. 5

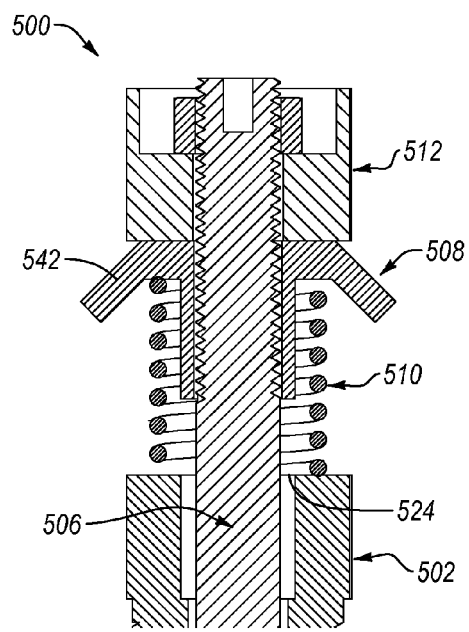
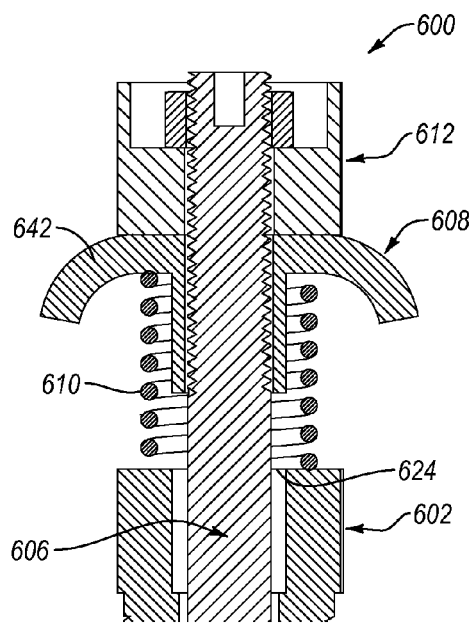
FIG. 15    FIG. 16
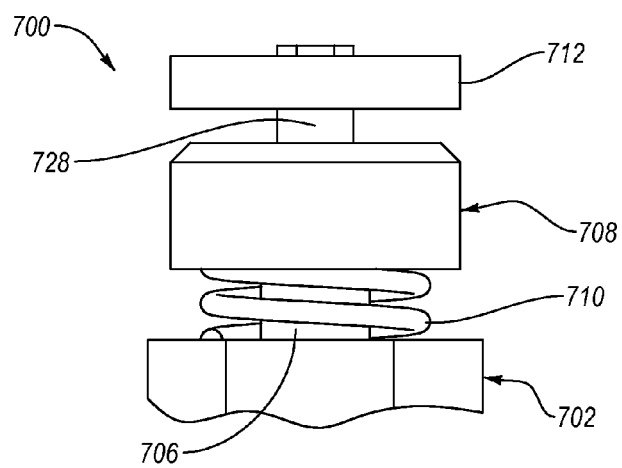
FIG. 17

SAFETY ISOLATION PLUG FITTINGS AND METHODS OF USE

CROSS-REFERENCE TO RELATED APPLICATIONS

This application claims the benefit of, and priority to, U.S. Provisional Patent Application Ser. No. 61/794,850, entitled "PRESSURE RELEASING BULL PLUG," and filed on Mar. 15, 2013, which is hereby incorporated herein in its entirety by this reference.

BACKGROUND

In pipeline transmission and distribution systems, it is frequently necessary to relocate or expand existing pipelines, install new valves or repair old ones, install new laterals, perform maintenance, or access lines during emergencies. Historically, it has been common practice to shut down the portion of the pipeline during the alteration and vent the isolated portion of the pipeline. However, if boundary or isolation valves and pressure venting systems do not function properly, unwanted and/or undetected residual pressure in the isolated portion of the pipeline can pose a serious threat to operators and/or the environment. For instance, a boundary valve may be corroded and/or defective such that it no longer prevents the flow of fluid in the isolated pipe section. This can create a dangerous situation when a user attempts to remove a plug fitting (e.g., a pipe plug, a quick connect, or other isolation fitting) not being aware that the boundary valve has failed and allowed the isolated pipe section to become or remain pressurized. More particularly, known plug fittings may blow off when the user attempts to loosen the fitting, causing potentially significant injury and/or death. In addition, this can result in a loss of product and/or an environmental release.

It can be seen from the foregoing there are many needs for improving on the drawbacks of conventional plug fittings. The embodiments of the present disclosure address these aforementioned shortcomings of known plug fittings.

SUMMARY

Disconnecting known plug fittings from presumably isolated or evacuated pipes can be extremely dangerous because these fittings do not allow users to determine whether pressurized and/or hazardous fluid remains in the pipe. Users of these fittings have accepted this as an inherent job risk and resigned themselves to partially opening a quick connect or partially unthreading a pipe plug and hoping that the pipe is not under significant pressure or full of a harmful or hazardous material. The safety isolation plug fittings of the present invention, however, have recognized that providing a user with the ability to safely identify and/or vent pressurized flow in a pipe without disconnection of the plug fitting from the pipe provides numerous benefits, such as enhancing user safety and reducing environmental emissions.

In particular, some embodiments of the present invention include a safety isolation plug fitting for detecting and/or venting pressurized fluid in a pipe. The plug fitting can have a passageway adapted to be in fluid communication with the pipe and a valve assembly seated in the passageway that is movable between a closed position in which fluid communication through the passageway is inhibited and an open position in which a fluid can flow between the inlet and the outlet. The plug fitting can include a flow deflector in fluid communication with an outlet that is in fluid communication with the passageway. If the valve assembly is in the open position and fluid from the pipe forcefully exits the outlet, at least a portion of the fluid may be captured within the flow deflector. If desired, the force of the fluid against the flow deflector can cause the valve assembly to automatically return to the closed position, and thus prevent further fluid from escaping the pipe. This advantageously allows the user to easily and safely detect or vent pressure in the pipe without having to disconnect the plug fitting or having to manually close the valve assembly. This also avoids the uncontrolled releases of fluids that can result when known plug fittings are disconnected from a pipe under pressure. It will be appreciated that embodiments of the plug fitting can comprise a male fitting, a female fitting, a pipe plug, a bull plug, a cap, an elbow, a tee, a coupling, or any other suitable pressure integrity isolation device or fitting. It will also be appreciated that the pipe can comprise one or more pipe sections, fittings, tanks, conduits, wellbore tubulars, manifolds, tubes, hoses, pressure vessels, pressure tanks, and other like members which are used to convey, transport, store, and/or contain fluid.

The flow deflector can also function as a fluid redirection device. For instance, fluid escaping from the pipe may have sufficient pressure that it could injure a user if the fluid were to come into direct contact with the user. Additionally, the fluid may contain materials that are hazardous if contacted. The flow deflector can redirect at least a portion of the pressurized fluid stream in a direction away from the user. This has the effect of at least partially shielding a user, substantially decreasing the risk of injury or harm to the user.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is a cross-sectional view of the safety isolation plug fitting shown in FIG. 2 in a closed position taken along line 4-4;

FIG. 5 is another cross-sectional view of the safety isolation plug fitting shown in FIG. 2 in an open configuration;

FIG. 15 is a partial cross-sectional view of a safety isolation plug fitting according to another embodiment;

FIG. 16 is a partial cross-sectional view of a safety isolation plug fitting according to another embodiment; and FIG. 17 is a partial isometric view of a safety isolation plug fitting according to another embodiment.

In the various figures, similar elements are provided with similar reference numbers. The figures are not drawn to scale or proportion, but instead are drawn to provide a better understanding of the components and are not intended to be limiting in scope but rather provide exemplary illustrations.

DETAILED DESCRIPTION

Figure 1:
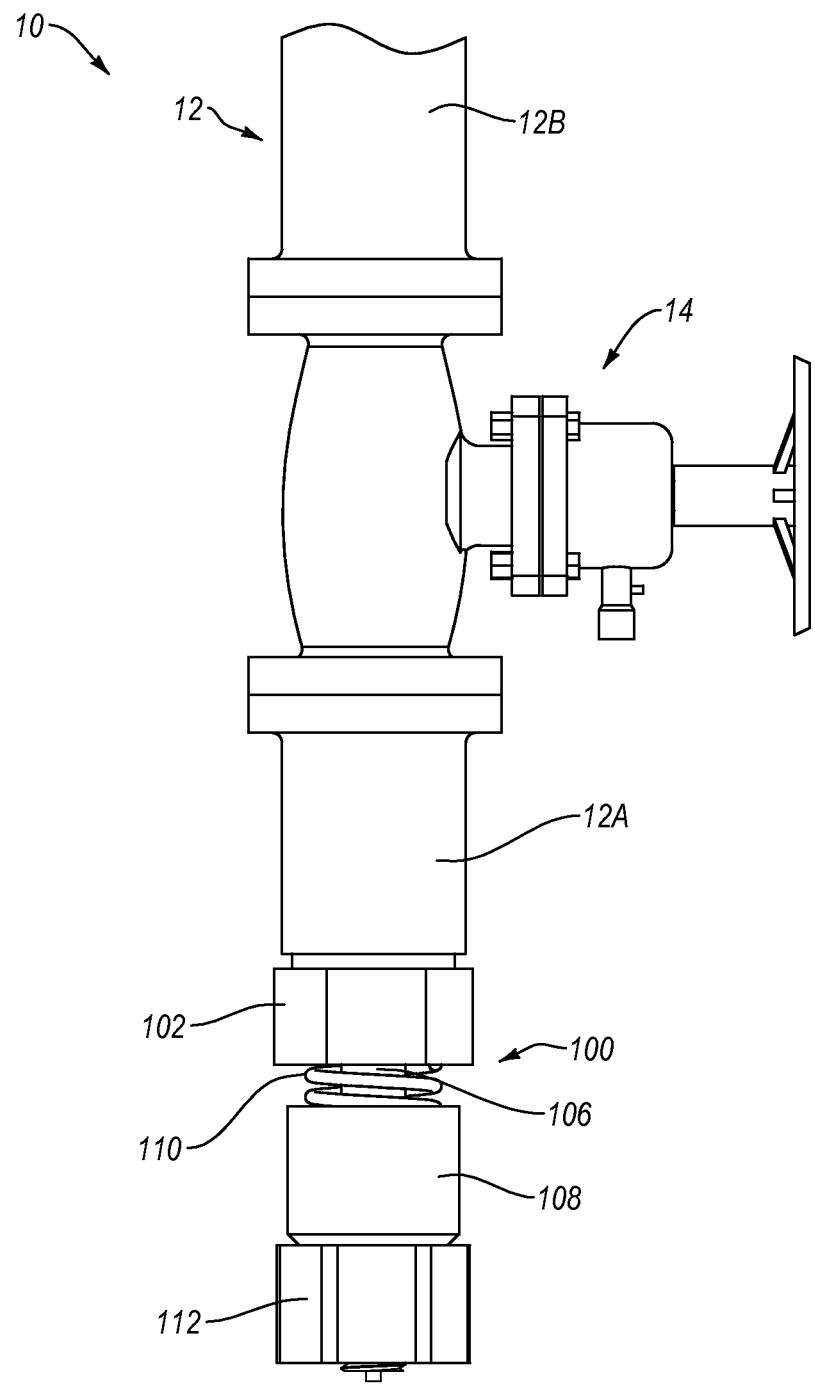
FIG. 1 illustrates a schematic view of a pipeline system including a safety isolation plug fitting according to an embodiment.
Figure 2:
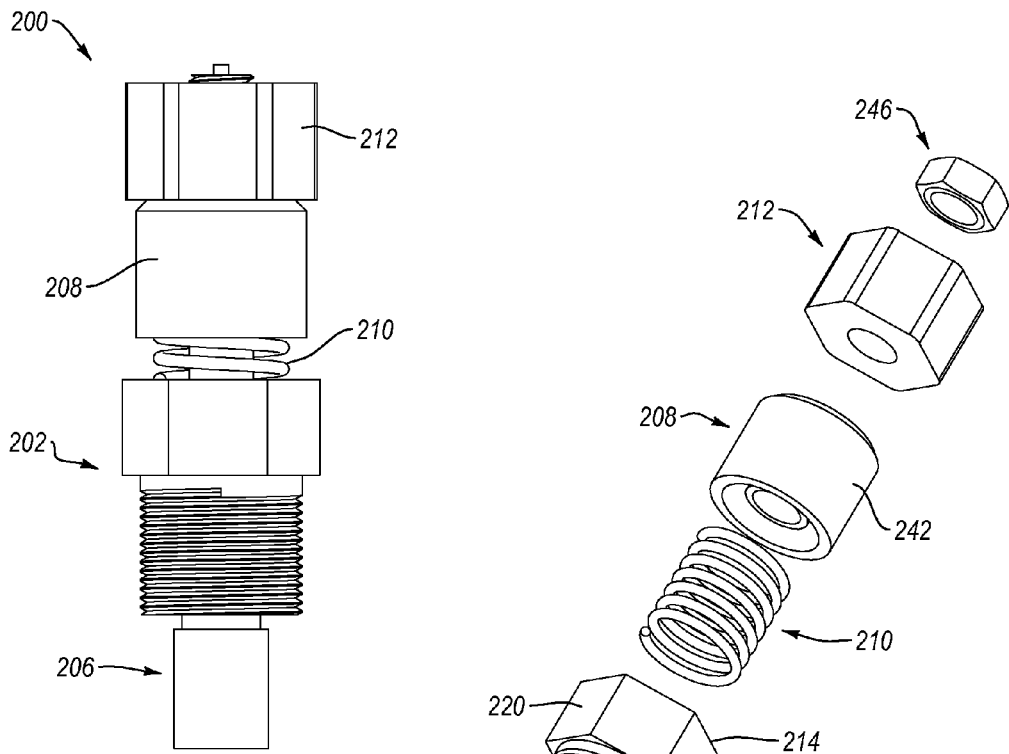
FIG. 2 is an isometric view of a safety isolation plug fitting according to an embodiment.
Figure 2:
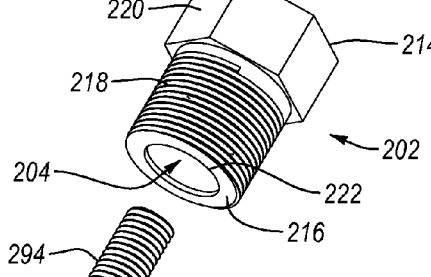

Reference will now be made to the exemplary embodiments illustrated in the figures, wherein like structures will be provided with like reference designations. Specific language will be used herein to describe the exemplary embodiments, nevertheless it will be understood that no limitation of the scope of the invention is thereby intended. It is to be understood that the drawings are diagrammatic and schematic representations of various embodiments of the invention, and are not to be construed as limiting the present invention. Alterations and further modifications of the inventive features illustrated herein, and additional applications of the principles of the inventions as illustrated herein, which would occur to one skilled in the relevant art and having possession of this disclosure, are to be considered within the scope of the invention. Furthermore, various well-known aspects of at least pipes, piping systems, pipe fittings, threaded connections, and mechanical fasteners are not described herein in detail in order to avoid obscuring aspects of the example embodiments.

In describing and claiming the present invention, the term "pipe" can refer to pipe sections, fittings, tanks, conduits, wellbore tubulars, manifolds, tubes, hoses, oil pipes, gas pipes, vapor pipes, air pipes, pressurized pipes, pressure tanks, pressure vessels, and other like members which are used to convey, transport, and/or contain pressurized and/or unpressurized fluid. Fluid can refer to gases, liquids, sold material suspensions, products, combinations thereof, or any other suitable material capable of flowing. Further, the term "user" can refer to an operator, a worker, an installer, an inspector, a manager, or any other appropriate individual or individuals.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Numerical data may also be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. Furthermore, such ranges are intended to be non-limiting examples of example embodiments, and should not be construed as required for all embodiments unless explicitly recited as such in the claims.

Illustrated in, and described relative to, FIGS. 1-17 are various embodiments of a safety isolation plug fitting. If the process and/or operational conditions permit, the plug fitting can be used to safely test and detect if any residual or line pressure or fluid is in a pipe without having to disconnect the plug fitting from the pipe.

The safety isolation plug fitting is suitable for use in a wide range of applications, and in connection with a wide variety of system fluids, including, but not limited to, crude oil and other petroleum products. However, such operating environments are exemplary only and embodiments of the plug fitting may, more generally, be employed in any other environment wherein the functionality disclosed herein would prove useful. For example, embodiments of the plug fitting are suitable for use with fluids such as compressed air or nitrogen, liquefied natural gas ("LNG"), liquefied propane ("LPG"), liquid oxygen, and refrigerants, on stationary equipment, on rolling stock, on temporary storage containers, and/or vessels. Accordingly, the exemplary operating embodiments, applications and system disclosed herein should not be construed to limit the scope of the invention in any way. Further, it will be appreciated that the present invention may be employed in any suitable pressure integrity isolation device or fitting wherein the functionality disclosed herein would prove useful. For instance, embodiments of the present disclosure can comprise caps, pipe plugs, quick connects, elbows, combinations thereof, or any other suitable device or fitting.

Now turning to the figures, specific examples of various safety isolation plug fittings will be described. It will be appreciated that the described and illustrated embodiments are merely exemplary and include various features and/or components that can be combined in different embodiments. Thus, no feature or component should be interpreted to require use with only one or more other components or features.

As illustrated in FIG. 1, embodiments of the safety isolation plug fitting can be employed in connection with a piping system 10. The system 10 may include a pipe 12 having sections 12A, 12B, an external valve 14, and a safety isolation plug fitting 100. The pipe 12 can be configured to transfer and/or store fluids under pressure. The pipe 12 may be made from any suitable material, including, but not limited to, metallic materials, stainless steel, rubber, silicone, plastic, nylon, combinations thereof, or the like. The external valve 14 may be configured to open or close a valve within the pipe 12. For instance, the external valve 14 can be used to shut off the flow of fluid within the pipe 12 to the plug fitting 100.

In some embodiments, it may be intended that the external valve 14 is closed such that no fluid is disposed within pipe section 12A between the external valve 14 and the plug fitting 100. In practice, however, one will understand that the external valve 14 may be corroded and/or defective such that it no longer prevents the flow of fluid into the pipe section 12A. As discussed above, this could create a dangerous situation if an operator or other individual attempts to the remove the plug fitting 100 from the pipe section 12A, not being aware that the external valve 14 has failed and allowed the pipe section 12A to become or remain pressurized. In particular, a conventional bull or pipe plug provides an operator with no method of determining whether the pipe section 12A is pressurized, and therefore may be blown off when the operator attempts to loosen the plug, causing potentially significant injury and/or death.

While more detailed information is provided below, the plug fitting 100 allows a user to safely detect or vent pressure in the pipe section 12A and generally includes a body 102 that is configured to be attached to the pipe section 12A. The body 102 defines a through passageway which is in fluid communication with the pipe section 12A. A valve assembly 106 is seated in passageway and moveable between a closed position in which fluid communication through the passageway is inhibited and an open position in which fluid communication through the passageway is established. The valve assembly is normally in the closed position. The valve assembly 106 can include a shaft portion extending out of an outlet defined in the body and flow deflector 108 attached to the shaft portion. A resilient member 110 can be disposed on the shaft portion of the valve assembly 106 between the body 102 and the flow deflector 108 that biases the valve assembly 106 toward the closed position. A grip member 112 can be attached to the shaft portion above the flow deflector 108.

In use, a user can push or tap on the grip member 112 to move the valve assembly 106 to the open position. In the open position, fluid that is present in the pipe section 12A can flow through the passageway and out of the body 102. In the situation that the fluid in the pipe section 12A is under pressure, a portion of the fluid may forcefully pass through the passageway and out of the body 102. As the fluid forcefully exits the body 102, at least a portion of the fluid may be captured by the flow deflector 108. The force of the fluid against the flow deflector 108 can push the flow deflector 108 away from the body 102, causing the valve assembly 106 to automatically return to the closed position, now considered a "failed closed" position and thus preventing further fluid from escaping from the pipe section 12A. This advantageously allows the user to easily and safely identify and/or vent pressure and/or fluid in the pipe section 12A without having to disconnect the plug fitting 100 or having to manually close the valve assembly 106. This also avoids the uncontrolled releases fluids that can result when known pipe plugs are disconnected from a pipe under pressure.

The flow deflector 108 can also redirect a pressurized fluid stream exiting the body 102 in a direction away from the user. For instance, the flow deflector 108 can redirect an exiting pressurized fluid stream back in the direction of the pipe section 12A and away from the user. This has the effect of advantageously at least partially shielding a user from pressurized fluid, substantially decreasing the risk of injury or harm to the user. A fluid release capture device may be attached to the body to reduce the release to the ambient environment.

Any of the components of the plug fitting 100 may be varied as necessary to suit the requirements of a particular application or operation. For example, the geometry of the plug fitting 100 such as, but not limited to, the length, the shape, the diameter, and wall thickness of the plug fitting 100 may be modified. Further, one or more components of the plug fitting 100 may be constructed from a variety of metallic and non-metallic materials, such as, but not limited to, copper, steel, aluminum, alloys, and plastic.

With references to FIGS. 2 through 6, further details are provided concerning the construction of an exemplary safety isolation plug fitting, denoted generally as 200. The plug fitting 200 can include a body 202, a valve assembly 206, a flow deflector 208, a resilient member 210, and grip member 212.

The body 202 may have a generally cylindrical shape including a first end 214 and a second end 216 generally opposite the first end 214. A portion of the body 202 may be configured as necessary to enable attachment of the body 202 to a pipe (e.g., an oil pipeline, a fitting, or another piping component). For instance, the outer surface of the body 202 toward the second end 216 can include a male threaded portion 218 adapted to threadedly engage a female threaded portion of a pipe.

Optionally, the outer surface of the body 202 toward the first end 214 can have a diameter greater than the diameter of the male threaded portion 218 and can include a tool-connectable portion 220 adapted to receive a wrench or other tool to rotate the body 202, or resist rotation of the body 202 as needed. For instance, the tool-connectable portion 220 can comprise wrench flats disposed about the outer circumference of the body 202 such that a user can drive the plug fitting 200 into a pipe with a wrench.

It will be appreciated that while the body 202 is shown including the male a threaded portion 218, in other embodiments, the body 202 may be adapted to be welded, brazed, bolted, threaded onto, combinations thereof, or attached to the pipe in any suitable manner. Moreover, it will be appreciated that the body 202 and/or plug fitting 200 can exhibit any suitable plug fitting configuration. For instance, in the illustrated embodiment, the body 202 can be configured as a male fitting or plug. In other embodiments, a cylindrical ring member can be connected to the body 202 that extends beyond the second end 216. The inner diameter of the cylindrical ring member can include a female threaded portion adapted to threadedly engage a male threaded portion of a pipe. Thus, the body 202 can be configured as a female fitting or cap. In other embodiments, the second end 216 of the body 202 can include a counter-bore formed therein including a female threaded portion adapted to threadedly engage a male threaded portion of a pipe. Further, while the body 202 is described having a generally cylindrical shape, in other embodiments, the body 202 may be configured as a tee, an elbow, or any other suitable configuration. More generally, the body 202 may be configured in any form that would enable effective implementation of the functionality disclosed herein.

The body 202 may define a passageway 204 extending between the first end 214 and the second end 216. The first end 214 can include an opening defining an inlet 222 in fluid communication with the passageway 204. The second end 216 can include an opening defining an outlet 224 (shown in FIGS. 4 and 5) in fluid communication with the inlet 222 via the passageway 204. The passageway 204 can include a radially enlarged portion toward the inlet 222 that defines a seat 226, which has a geometry that, in general, is complementary with the geometry of the face of the valve assembly 206 described below.

In the illustrated embodiment, the seat 226 has a generally conical shape having a diameter that tapers away from the inlet 222. However, it will be appreciated that the geometries of the seat 226 and the face are exemplary only and other geometries are possible. In addition, the construction of the body 202 may be dependent on a number of different factors, such as the anticipated sized of the pipe, the type of connection to be made, the anticipated operating pressure, fluid type, the preference of the user, and/or other factors.

Figure 3:
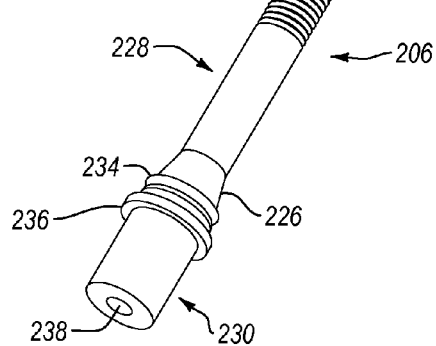
FIG. 3 is an exploded view of the safety isolation plug fitting shown in FIG. 2.

Referring to FIGS. 3-5, the valve assembly 206 can be seated and slidably positioned in the passageway 204. The valve assembly 206 can include a shaft portion 228 and a head portion 230. The valve assembly 206 can be positioned in the passageway 204 such that at least a portion of the shaft portion 228 extends out of the outlet 224 and at least a portion of the head portion 230 extends out of the inlet 222.

A face 232 of the valve assembly 206 can be adapted to selectively engage and/or interact with the seat 226 of the body 202. As noted above, the face 232 can have a geometry that, in general, is complementary with the geometry of the seat 226. For instance, the face 232 can have a conical shape with a diameter that tapers from the head portion 230 toward the shaft portion 228 of the valve assembly 206. Generally, when the face 232 of the valve assembly 206 engages or contacts the seat 226 of the body 202, the valve assembly 206 is in a closed position (shown in FIG. 4). In the closed position, fluid communication between the inlet 222 and the outlet 224 is inhibited. When the face 232 of the valve assembly 206 is disengaged from the seat 226, the valve assembly 206 is in an open position (shown in FIG. 3). In the open position, fluid communication between the inlet 222 and the outlet 224 is established, thus any fluid present in a pipe can flow through the passageway 204 and out of the outlet 224 of the body 202.

The engagement between the face 232 and the seat 226 can form a primary seal to inhibit fluid communication between the inlet 222 and the outlet 224. For instance, the engagement between the face 232 and the seat 226 can form a metal-to-metal lapped seal. A secondary sealing element 234 can be disposed within a groove defined in the face 232 of the valve assembly 206. The secondary sealing element 234 can be compressed between the seat 226 and the face 232. This can help improve the seal created between the face 232 and the seat 226 when the valve assembly 206 is in the closed position. The secondary sealing element 234 may comprise a PTFE, a synthetic rubber, or a fluoropolymer elastomer (e.g., VITON™) O-ring, but other sealing element materials and/or configurations may be employed.

Optionally, a tertiary sealing element 236 can be disposed in another groove defined in valve assembly 206 and adapted to help protect the face 232, the seat 226, and the secondary sealing element 234 from particulates, abrasive materials, and/or other materials that may negatively affect performance of the valve assembly 206 in the closed position. For instance, the tertiary sealing element 236 can comprise an elastomeric disc that is sized and positioned to overlap at least portion of the inlet 222 and to abut a surface area of the body surrounding the inlet 222. The tertiary sealing element 236 can be configured to keep debris and other foreign material from entering and contaminating the sealing surfaces. It will be appreciated that other sealing element materials and/or configurations are also possible.

In an embodiment, movement of the shaft portion 228 down into the passageway 204 can disengage the face 232 of the valve assembly 206 from the seat 226, which, in turn, can move the valve assembly 206 to the open position (shown in FIG. 5). Movement of the shaft portion 228 up out of the passageway 204 can cause the face 232 of the valve assembly 206 to contact or engage the seat 226, which, in turn, can move the valve assembly 206 to the closed position (shown in FIG. 4).

In some embodiments, the fluid pressure against the bottom of the head portion 230 from a pipe can bias the valve assembly 206 toward the closed position. Moreover, because of the geometries and orientation of the face 232 and seat 226, the further the face 232 is forced into the seat 226, the stronger the seal between the face 232 and the seat 226.

The shaft portion 228 of the valve assembly 206 can extend out of the outlet of the body 202 and can have a generally circular cross-section. Of course, this is exemplary only, and the shaft portion 228 may have a substantially hexagonal cross-section, oval cross-section, a triangular cross-section, or a polygonal cross-section or any other suitable cross-section shape. In an embodiment, the shaft portion 228 can include a male threaded portion 294. The male threaded portion 294 can have any suitable length. For instance, the male threaded portion 294 may have a length configured to extend into the outlet 224 or a length that terminates before the male threaded portion 294 enters the outlet 224 in the open position. Moreover, it will be appreciated that the shaft portion 228 can have any suitable length.

The head portion 230 can extend out of the inlet 222 and can have a generally circular cross-section. As seen, the head portion 230 can have a diameter that is larger than the diameter of the shaft portion 228. At least some of the head portion 230 can be adapted to protrude into the interior space of the pipe. Optionally, the head portion 230 can include a connection portion 238. For instance, the connection portion 238 can comprise female attachment threads (shown in FIG. 4) or male attachment threads (shown in FIG. 7) or any other suitable attachment mechanism. As discussed below, the connection portion 238 can be adapted to allow one or more modules to be attached to the head portion 230.

The flow deflector 208 can be connected to the shaft portion 228 and can extend over the outlet 224. The flow deflector can include a fastener portion 240 having a threaded bore. The threaded bore can threadedly engage the male threaded portion 294 of the shaft portion 228. The flow deflector 208 can further include at least one deflector portion 242 that can capture and/or redirect a pressurized fluid stream in a direction away from a user. For instance, the deflector portion 242 can extend over or be in fluid communication with the outlet 224 to form a flow path that, in the embodiment shown, is generally directed away from the user and toward the pipe. In other embodiments, the deflector portion 242 can form a flow path that is generally directed away from the user and away from the deflector portion 242. The deflector portion 242 can form a flow path that is different than the normal flow path of the pressurized fluid stream exiting the outlet 224. In yet other embodiments, the deflector portion 242 can form a flow path that is generally directed away from the user and generally parallel or acute to the pipe. The deflector portion 242 can comprise a cap-like member having a generally flat upper wall and a cylindrical sidewall extending around and downward from the upper wall. The flow deflector 208 can be made of metal, plastic, combinations thereof, or any other appropriate material.

In the situation the valve assembly 206 is in the open position and fluid in a pipe attached to the plug fitting 200 is under substantial pressure, a portion of the fluid may forcefully pass through the passageway 204 and out of the outlet 224. As the fluid forcefully exits the outlet 224, at least a portion of the fluid may be captured by the flow deflector 208. For instance, the fluid may be captured in a space between the fastener portion 240 and the deflector portion 242. The force of the fluid against the flow deflector 208 may push the flow deflector 208 away from the body 202, causing the valve assembly 206 to return to the closed position, and thus preventing further fluid from escaping the pipe. This advantageously allows the user to vent pressurized fluid from a pipe attached to the plug fitting 200 in a safe and controlled manner. For instance, the user can repeatedly push on or tap the grip member 212 until any residual pressure in the pipe is vented. The flow deflector 208 can also redirect a pressurized fluid stream back in the direction of the pipe and away from the user. This has the effect of advantageously at least partially shielding a user from pressurized fluid, gas, and/or debris, substantially decreasing the risk of injury or harm to the user.

It will be appreciated that the flow deflector 208 may be configured in any form that would enable the flow deflector to redirect and/or capture exiting pressure and/or fluid.

Referring still to FIGS. 4 and 5, the resilient member 210 can be disposed on the shaft portion 228 between the outlet 224 and the flow deflector 208. As seen, at least a portion of the resilient member 210 can be positioned within the space defined between the fastener portion 240 and the deflector portion 242 of the flow deflector 208. An upper surface of the receiving space can engage the resilient member 210 to compress the resilient member 210 between the body 202 and the flow deflector 208.

The resilient member 210 can be adapted to bias the valve assembly 206 toward the closed position. For instance, in the closed position, the resilient member 210 biases the flow deflector 208 away from the body 202, which, in turn, biases the face 232 toward the seat 226 of the body 202. When the valve assembly 206 is moved to the open position, the flow deflector 208 can move with the shaft portion 228 to compress or further compress the resilient member 210 between the body 202 and the flow deflector 208.

As the valve assembly 206 is released, the stored energy in the resilient member 210 can push the flow deflector 208 back away from the body 202, which in turn, pulls the face 232 of the valve assembly 206 back into the seat 226 to return the valve assembly 206 to the closed position. Thus, the resilient member 210 can automatically close the valve assembly 206. This can advantageously allow the user to identify the presence of and/or vent pressurized fluid in a pipe in a safe and controlled manner. For instance, a user can repeatedly tap or hit the valve assembly 206 until the pressurized fluid is vented from the pipe.

The resilient member 210 can comprise any suitable member. For example, the resilient member 210 can comprise a coil spring, a resilient clip, a variable spring, a leaf spring, a flat spring, a conical spring, a helical spring, or any other suitable resilient member. While one resilient member 210 is shown, in other embodiments, the plug fitting 200 can include two, three, or any other number of resilient members 210. The resilient member 210 can be made from steel, alloys, plastic, or any other appropriate material.

The plug fitting 200 can further include a spring tensioner. For instance, the spring tensioner can comprise the flow deflector 208. By moving or tightening the flow deflector 208 down the male threaded portion 294, the compression of the resilient member 210 can be increased. This can increase the force required to move the valve assembly 206 into the open position. On the other hand, by moving or loosening the flow deflector 208 up the male threaded portion 294, the compression of the resilient member 210 can be decreased such that force required to actuate the valve assembly 206 is reduced. In an embodiment, the flow deflector 208 can be tightened completely such that the flow deflector 208 seals of the passageway 204.

The grip member 212 can be configured for easy pushing and/or pulling on the shaft portion 228. As shown, the grip member 212 can be attached to the shaft portion 228 above the flow deflector 208. The grip member 212 can comprise an ergonomic hex nut including a threaded bore that threadedly engages the male threaded portion 294 of the shaft portion 228. Grip member 212 may be color coded, say yellow, indicating caution during regular operation. Additionally, should an unsafe pressure situation be detected, the grip member 212 may be removed an operator, say during a pressure test or valve or piping integrity safety audit, and the situation be documented. The remaining element 208 would be color coded, say red, to indicate the newly discovered dangerous situation alerting nearby operators.

Optionally, a locking member 246 can be threadedly attached to the male threaded portion 294 of the shaft portion 228 to prevent the grip member 212 from threading itself off of the end of the shaft portion 228. The locking member 246 can comprise a locknut or the like.

The operation of the plug fitting 200 according to an embodiment will be described. To open the valve assembly 206, a user can push on the grip member 212, causing the shaft portion 228 to extend down the passageway 204 (shown in FIG. 5). Extending the shaft portion 228 down into the passageway 204 can cause the face 232 of the valve assembly 206 to disengage from the seat 226 of the body 202 such that the valve assembly 206 moves to the open position. In the open position, fluid present within a pipe operatively attached to the plug fitting 200 can flow through the passageway 204 and out of the outlet 224 of the body 202.

In the situation that the fluid in the pipe is under significant pressure, a portion of the fluid may forcefully pass through the passageway 204 and out of the outlet 224. As the fluid forcefully exits the outlet 224, at least a portion of the fluid may be captured within the flow deflector 208. The force of the fluid against the flow deflector 208 may push the flow deflector 208 away from the body 202, causing the valve assembly 206 to return to the closed position, and thus preventing further fluid from escaping the pipe.

As described above, the flow deflector 208 can also function as a fluid redirection device. For instance, fluid escaping from a pressurized pipe may have sufficient pressure that it could injure a user if the fluid were to come into direct contact with the user. Additionally, the fluid may contain materials that are hazardous if contacted. The flow deflector 208 can redirect at least a portion of a pressurized fluid stream exiting or having exited the outlet 224 in a direction back toward the pipe and away from the user. The flow deflector 208 can redirect at least a portion of a pressurized fluid stream in a direction away from the user and away from the flow deflector 208. In other embodiments, the flow deflector 208 can redirect at least a portion of a pressurized fluid stream in a direction generally parallel or acute to the pipe and away from the user. It will be appreciated that the flow deflector 208 can redirect at least a portion of a fluid stream exiting or having exited the outlet 224 in any direction suitable to least partially shield a user from the fluid stream.

If the fluid within the pipe is under sufficient pressure it may be difficult or impossible to push the grip member 212 to move the valve assembly 206 into the open position. In particular, a user may not have enough strength to overcome the force of both the resilient member 210 (e.g., a compression spring whose compression is specified for a specific application) and the pressure against the bottom of the head portion 230 of the valve assembly 206. One will understand that in this situation, the user's inability to push the grip member 212 can notify the user that a fluid within the pipe is under high pressure. In an embodiment, the grip member 212 can be yellow and the flow deflector 208 can be red. If a user cannot move the valve assembly 206 into the open position, the user can remove the grip member 212 from the plug fitting 200, leaving a partially disassembled plug fitting 200, with the red flow deflector 208 in place. This advantageously has the effect of providing a visual and functional indication of a dangerous or unsafe pipe. The user can also take the yellow grip member 212 to a supervisor so that appropriate safety measures can be taken.

If a pipe is under low pressure, or if there is no fluid within the pipe, a user can easily push the grip member 212. In this situation, the user can be notified that there is either little or no pressure in the pipe. Upon verifying this, the user can know that it is safe to remove or work on the plug fitting 200. If any contamination enters the passageway 204 that could cause a leak, a user may safely bump or push on the grip member 212 in an attempt to clear the contamination.

Additionally, a user can use a pipe wrench or other tool on the flow deflector 208 to tighten the threads between the shaft portion 228 and the flow deflector 208, thus generating a force to further seal or move the valve assembly 206 toward the closed position. The flow deflector 208 can be tightened completely such that the flow deflector 208 physically seals off the outlet 224 of the body 202.

Thus, the user can advantageously and safely identify or test for entrained pressure and if permitted to do so, vent pressure in the pipe without having to disconnect the plug fitting 200 from the pipe. The user can also advantageously determine if any residual fluid remains in the pipe without having to disconnect the plug fitting 200.

Figure 6:
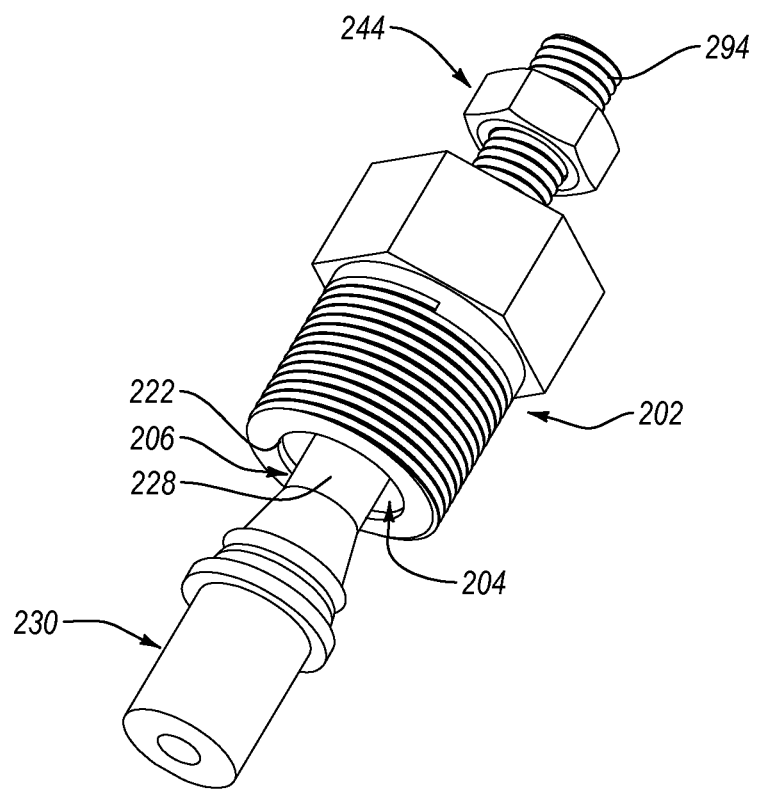
FIG. 6 is a partial isometric view of the safety isolation plug fitting shown in FIG. 2 including a stroke adjuster according to an embodiment.

Referring now to FIG. 6, a stroke adjuster 244 can be connected to the shaft portion 228 of the valve assembly 206 and adapted for increasing or decreasing the amount the passageway 204 is opened. The stroke can be the linear distance the valve assembly 206 travels between the closed position and the open position. The longer the stroke, the more fluid can pass through the passageway 204 of the body 202. For instance, because of the tapered geometry of the face 232 and/or the seat 226, the further the face 232 is separated from the seat 226, the greater the flow area through the inlet 222 and/or the passageway 204. This has the effect of allowing more fluid to flow through the body 202 when the valve assembly 206 is in the open position. Conversely, the further the face 232 of the valve assembly 206 is pulled toward the seat 226, the smaller the flow area through the inlet 222 and/or passageway 204. This has the effect of restricting the volume of fluid that can flow through the body 202 when the valve assembly 206 is in the open position. Accordingly, adjusting the stroke of the valve assembly 206 can help control the amount of fluid that can flow through the plug fitting 200.

In an embodiment, the stroke adjuster 244 can comprise a nut member located on the male threaded portion 294 of the shaft portion 228. Moving the nut member 244 down the shaft portion 228 toward the body 202 can limit the stroke of the valve assembly 206. For instance, moving the nut member 244 down the shaft portion 228 until the nut member 244, or be double lock nutted, may be adjusted to limit the release stroke to a desired limit, causing a predicated release or fully tightened against the body 202 can lock the valve assembly 206 in the closed position or prevent the valve assembly 206 from moving into the open position. Moving the nut member 244 up the shaft portion 228 away from the body 202 can allow for a longer stroke of the valve assembly 206. Optionally, once the stroke is set, the nut member 244 can be locked into place with a thread-locking compound.

The head portion 230 of the valve assembly 206 can include a connection portion 238 as shown in FIGS. 4 and 5. The connection portion 238 can be positioned on or in the terminal end of the head portion 230 generally opposite the face 232 of the valve assembly 206. The connection portion 238 can comprise a threaded female connector (shown in FIG. 5), a male threaded connector (shown in FIG. 7), or may exhibit any suitable configuration.

Figure 7:
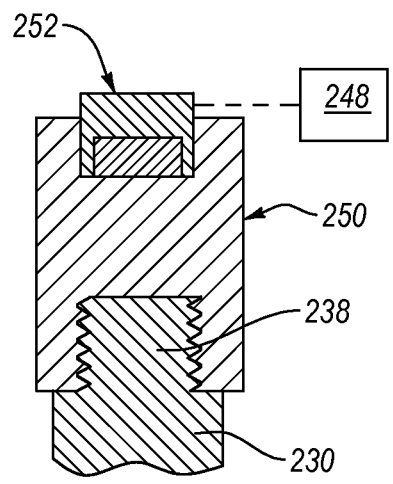
FIG. 7 is a cross-sectional view of a module according to an embodiment.

As will be made apparent from the following description, the connection portion 238 can allow various modules to be attached to the plug fitting 200. For instance, FIG. 7 illustrates a module 250 that can be attached to the plug fitting 200 according to an embodiment. The module 250 can include a connector configured to allow the module 250 to be connected to the connection portion 238. For instance, the connection portion 238 can comprise a male threaded portion configured to threadedly engage a female threaded connector of the module 250. The location of the connection portion 238 at the terminal end of the head portion 230 can allow the module 250 to be selectively positioned within the flow path of a pipe such that the module can detect or measure one or more conditions within the pipe. For instance, the module 250 can include a pressure sensor 252 that detects fluid pressure within the pipe (see. e.g., pipe section 12A). The pressure sensor 252 is intended to be in fluid communication with the fluid flow in a pipe, or at least configured such that pressure measured by the pressure sensor 252 is essentially equivalent to fluid pressure in the pipe, even if there is no direct contact between the fluid and the pressure sensor 252.

The pressure sensor 252 can be adapted to convert pressure energy to one or more sensing signals in the form of electrical energy. The pressure sensor 252 may have numerous functional elements and configurations, including optical sensors, mechanical sensors, radio frequency sensors, micro-electrical-mechanical (MEMs) sensors, and the like.

The pressure sensor 252 can include one or more transceivers to generate the one or more signals. In an embodiment, the pressure sensor 252 can generate one or more sensing signals as a function of pressure imposed on the pressure sensor 252, and provide the one or more sensing signals or digital data associated with the signals to a control unit 248.

The connection between the pressure sensor 252 and the control unit 248 may be a wireless or wired connection. The control unit 248 can be integral to the pressure sensor 252 or the control unit 248 can be separated from the pressure sensor 252. The control unit 248 may be a single microprocessor or plural microprocessors that may include means for controlling other components.

In an embodiment, the control unit 248 may include all components required to run an application such as, for example, a memory, a secondary storage device, and a processor such as a central processing unit. Control unit 248 may analyze and compare received and stored data, and based on instructions and data stored in the memory or input by a user, determine whether is action is required. Control unit 248 may include any memory device for storing data relating to operating conditions of a pipe or pipeline system and its components. The control unit 248 may be a computer, an external computer network, a smart-phone, or a dedicated analysis system for displaying and/or analyzing data recorded by the pressure sensor 252. The control unit 248 may be located in a control room. The pressure sensor 252 may communicate with the control unit 248 (e.g., a network connected device), which, in turn, can communicate pressure information to a remote computing device, such as a personal computer or a smart-phone.

In the situation that the pressure sensor 252 detects that the fluid within the pipe is under pressure, and a dangerous level of pressure is detected, the pressure sensor 252 may output a corresponding signal to the control unit 248, which indicates the pressure, for example, by an audio or visual alarm signal. For instance, the control unit 248 may, for example, be connected to an alarm device, which is set off on detection of the pressure, which will then be an indication of a threat or danger in the pipe. This advantageously provides an early warning to a user, which, in turn, substantially reduces the risk of injury and allows proper safety precautions to be taken. The alarm device may be located in a control room, may be incorporated in a smart-phone, or may be located in any other suitable location. In some embodiments, the pressure sensor 252 may communicate directly with the alarm device that sets off on detection of pressure. Thus, pressure and/or fluid in the pipe may be safely identified without having to remove the plug fitting 200 from the pipe.

Alternatively, the control unit 248 can output instructions regarding safety procedures that are specific to the level of pressure detected by the pressure sensor 252.

In the situation that the pressure sensor 252 detects that the fluid within the pipe is under pressure, if the fluid is not under a dangerous level of pressure, a user may bleed off or vent the pressure by pushing the grip member 212 as described above.

Figure 8:
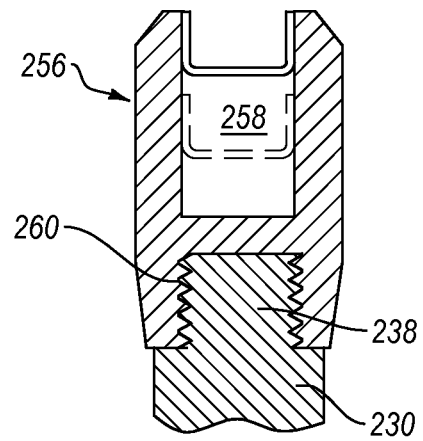
FIG. 8 is a cross-sectional view of a module according to another embodiment.

FIG. 8 illustrates a module 256 that can be attached to the connection portion 238 according to yet another embodiment. The module 256 can include a connector 260 configured to allow the module 256 to be connected to the connection portion 238 of the head portion 230. For instance, the connection portion 238 can comprise a male threaded connector configured to threadedly engage a female threaded connector 260 of the module 256.

The module 256 can comprise a freeze plug including a pressure resistant bladder 258 configured to be exposed within the pipe. The pressure-resistant bladder 258 can be adapted to collapse if it is exposed to a freezing medium. The collapse of the pressure-resistant bladder 258 can help prevent damage to the threads of the plug fitting 200 by relieving pressure. It will be appreciated that the described embodiment of the freeze plug 256 is exemplary only, and other embodiments are possible.

Figure 9:
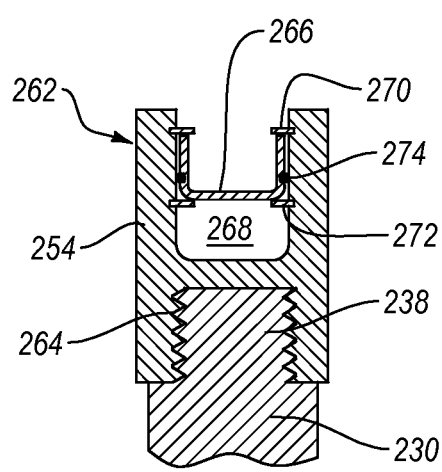
FIG. 9 is a cross-sectional view of a module according to another embodiment.

FIG. 9 illustrates a module 262 that can be attached to the connection portion 238 according to an embodiment. Similar to the freeze plug 256, the module 262 can include a connector 264 configured to allow the module 262 to be connected to the connection portion 238 of the head portion 230. For instance, the connection portion 238 can comprise a male threaded connector configured to threadedly engage a female threaded connector 264 of the module 262. However, it will be appreciated that the module 262 can include a male threaded connector configured to threadedly engage a female threaded connector of the head portion 230 or may be connected to the head portion 230 in any suitable manner.

The module 262 can comprise a pressure compensator that includes a body 254 and a cup 266 positioned within a closed bottom opening 268 defined in the body 254. A snap ring 270 can be adapted to assist in maintaining the cup 266 within the opening 268. A fracture clip 272 supporting the cup 266 can be adapted to break at a specific pressure. A sealing member or O-ring 274 can be interposed between the cup 266 and sidewalls of the opening 268. This can create an air gap for preventing fluid from infiltrating between the cup 266 and the body 254.

The pressure compensator 262 can prevent damage to the plug fitting 200 or other fittings. For instance, in some situations, a connector or valve closing may cause a sudden pressure spike within fluid trapped in a pipe. Pressure spikes can cause damage such as breaking pipe plugs or other pipe-connected components. The pressure compensator 262 can lessen the impact of such pressure spikes by collapsing the cup 266 into the opening 268 of the body 254 in response to the pressure spike. The collapse of the cup 266 can increase the volume available within the pipe or trapped volume, which, in turn, lowers the pressure level. If water freezes, for example, it expands and creates increasing pressure within a pipe or other trapped volume. Once a pressure spike reaches the collapse pressure of the fracture clip 272, the fracture clip 272 can break, causing the cup 266 to collapse into the opening 268.

Pressure clips of various strengths and ratings can be selected for particular applications and/or situations including, but not limited to, mechanical damage that may be caused by water freezing and expanding, causing stresses found in pipe "dead legs". The fracture clip 272 can be configured to break at greater than about 1000 Psi, about 2000 Psi, about 3000 Psi, or about 4000 Psi. The fracture clip 272 can be configured to break at a higher or lower collapse pressure. For instance, if a pipe contains a fitting or component that will be damaged at pressures over 2000 Psi, the plug fitting 200 can be customized to include a fracture clip 272 that breaks at 2000 Psi or lower. In contrast, in another situation it may not be desirable for pressure within a pipe to drop below a specific pressure, such as, for example, 1500 Psi.

Additionally, one will understand that the above examples of modules are merely illustrative and that any module that is useful for performing measurements or detecting fluid within a pipe can be attached to the plug fitting 200. For instance, the plug fitting 200 can include temperature sensors, chemical sensors, mechanical sensors, or the like.

It will be appreciated that the plug fitting 200 is to be regarded as exemplary only, as any plug fitting is possible. For example, while the shaft portion 228 is shown including the male threaded portion 294, in other embodiments, the male threaded portion 294 may be omitted. In alternative embodiments, some or all of male threaded portion 294 may be omitted and the flow deflector 208, the grip member 212, and/or the stroke adjuster 244 can be configured to be welded, brazed, fastened, combinations thereof, or attached to the shaft portion 228 in any other suitable manner. In other embodiments, the valve assembly may comprise a gate valve, a ball valve, a check valve, a dual-action valve, a diaphragm valve, or any other suitable valve.

Figure 10:
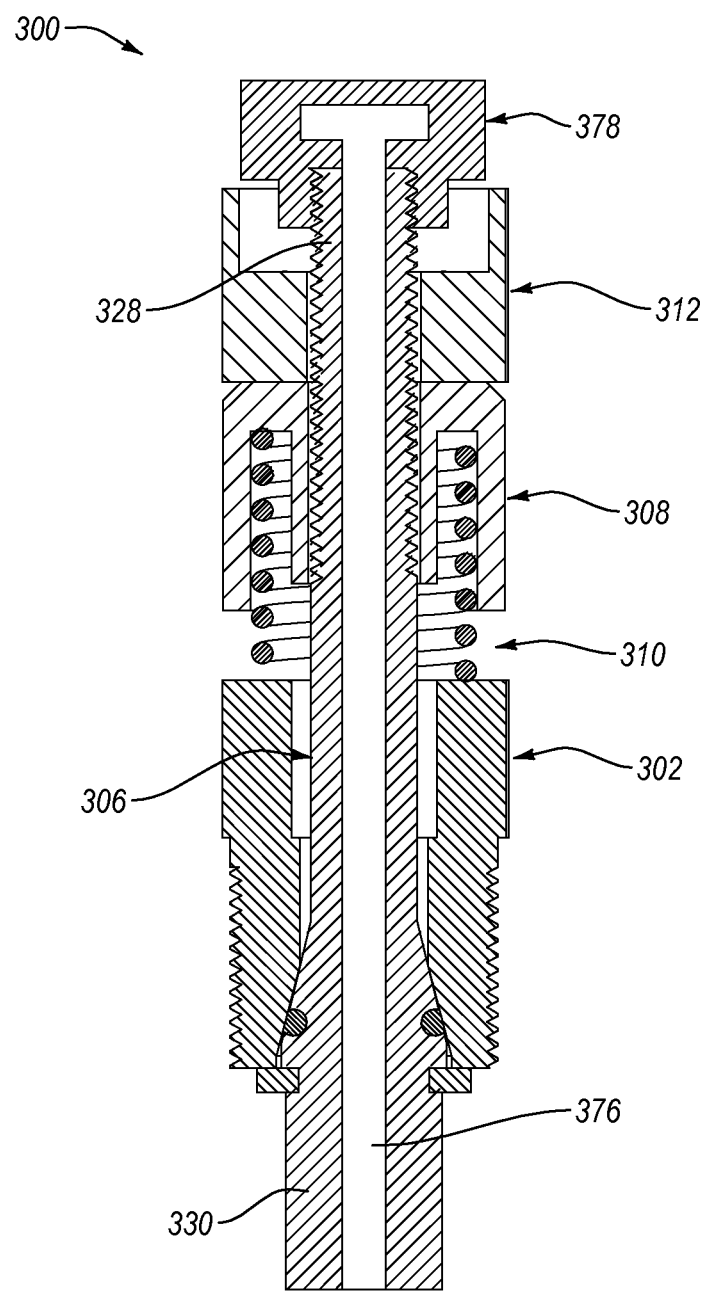
FIG. 10 is a cross-sectional view of a safety isolation plug fitting according to another embodiment.
Figure 11:
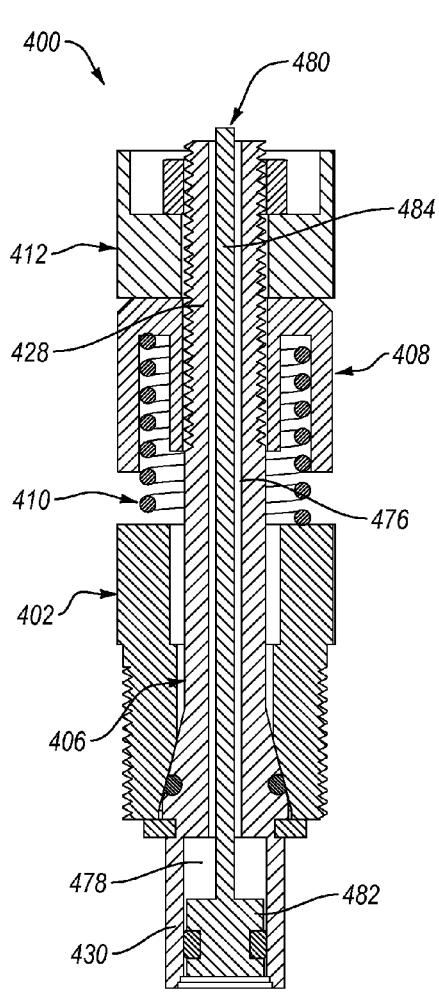
FIG. 11 is a cross-sectional view of a safety isolation plug fitting according to another embodiment.
Figure 12:
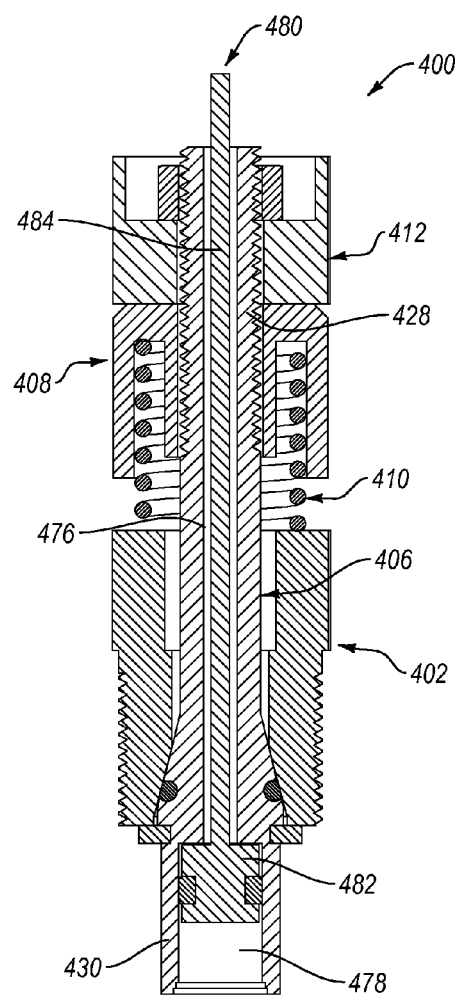
FIG. 12 is another cross-sectional view of the safety isolation plug fitting shown in FIG. 11.

FIG. 10 illustrates another example embodiment of a safety isolation plug fitting 300 within the scope of the present invention. In this embodiment, body 302, flow deflector 308, resilient member 310, and grip member 312 have a construction similar to body 202, flow deflector 208, resilient member 210, and grip member 312, but the plug fitting 300 has a different valve assembly 306. For example, the valve assembly 306 can include a longitudinal passageway 376 defined therein. The passageway 376 can extend from opening in the terminal end of the head portion 330 to a pressure gauge 378 disposed on the terminal end of the shaft portion 328. The passageway 376 may be open to fluid within a pipe. Alternatively, the passageway 376 may be closed to fluid, but instead contains at least one wire for communicating with a module disposed within the pipe. The pressure gauge 378 may be threadedly attached to the shaft portion 328, such that the pressure gauge 378 can be selectively removed from the shaft portion 328.

The pressure gauge 378 may be configured to measure pressure within a pipe through the passageway 376. In some embodiments, the pressure gauge 378 can include an electronic transmitter that communicates with a control unit (e.g., control unit 248). The pressure gauge 378 may communicate with the control unit (e.g., a network-connected device), which, in turn, can communicate pressure information to a remote computing device, such as a personal computer or a smart-phone.

FIGS. 11-14 illustrate another example embodiment of a safety isolation plug fitting 400 within the scope of the present invention. In this embodiment, body 402, flow deflector 408, resilient member 410, and grip member 412 have a construction similar to body 202, flow deflector 208, resilient member 210, and grip member 212, but the plug fitting 400 has a different valve assembly 406. For example, the valve assembly 406 can include a longitudinal passageway 476 defined therein. The passageway 476 can extend from an opening in the terminal end of the head portion 430 to an opening in the terminal end of the shaft portion 428. The passageway 476 can include an enlarged portion near the opening in the head portion 430 that defines a plate-receiving space 478 that is configured to be in fluid communication with a pipe.

The plug fitting 400 can include an indicator member 480 for indicating when a pipe is pressurized or when a specific pressure has been exceeded in the pipe. The indicator member 480 can comprise a push portion 482 and a plunger shaft 484 extending from the push portion 482. The bottom of the push portion 482 may provide a pressure contact surface area. In addition, the push portion 482 can be configured to form a seal between the push portion 482 and the sidewalls of the plate receiving space 478. For instance, a sealing member may be positioned in a groove formed in the push portion 482.

The indicator member 480 can be moveably disposed, at least in part, within the passageway 476. More particularly, the push portion 482 may be positioned in the plate-receiving space 478 and the plunger shaft 484 extends into the passageway 476. The indicator member 480 can be movable between a retracted position, wherein the indicator member 480 is concealed within the passageway 476 (shown in FIG. 11), and an extended position, wherein the plunger shaft 484 extends through the opening in the terminal end of the shaft portion 428 (shown in FIG. 12). This advantageously allows pressure to be identified in a pipe without having to remove the plug fitting 400 from the pipe, which, in turn, reduces the risk of injury to a user.

The indicator member 480 may be in its normally retracted position until pressure or a specified pressure within the pipe pushes on the bottom of the push portion 482, causing the indicator member 480 to move to the extended position. The specific pressure can be greater than about 100 Psi, about 200 Psi, 500 Psi, 1000 Psi, 2000 Psi, or greater than about 3000 Psi. In other embodiments, the specific pressure can be higher or lower.

In the extended position, the indicator member 480 advantageously provides a visual indication to the user that the pipe is pressurized or that the specific pressure has been exceeded. To further enhance the visibility of the plunger shaft 484 when it is in the extended position, a cap or brightly colored portion may be attached to the end thereof. The indicator member 480 may be configured to remain in the extended position until reset by the user or a control unit. This has the effect of identifying pressure and providing a warning of the same to the user, which, in turn, substantially decreases the risk of injury.

Alternatively, the indicator member 480 may include a spring member that biases the indicator member 480 toward its normally retracted position. The spring member may be disposed on the plunger shaft 484 between the push portion 482 and a top surface of the plate-receiving space 478. The indicator member 480 may be biased toward the retracted position by the spring member until a specific pressure within the pipe overcomes the biasing force of the spring member and moves the indicator member 480 to the extended position. When the pressure in the pipe drops below the biasing force of the spring member, the force of the spring member can return the indicator member 480 to the retracted position. In other embodiments, a retaining member holds the indicator member 480 in the retracted position until the pressure within the pipe causes the retaining member to break or yield, at which time a spring member urges the indicator member 480 into the extended position.

Figure 13:
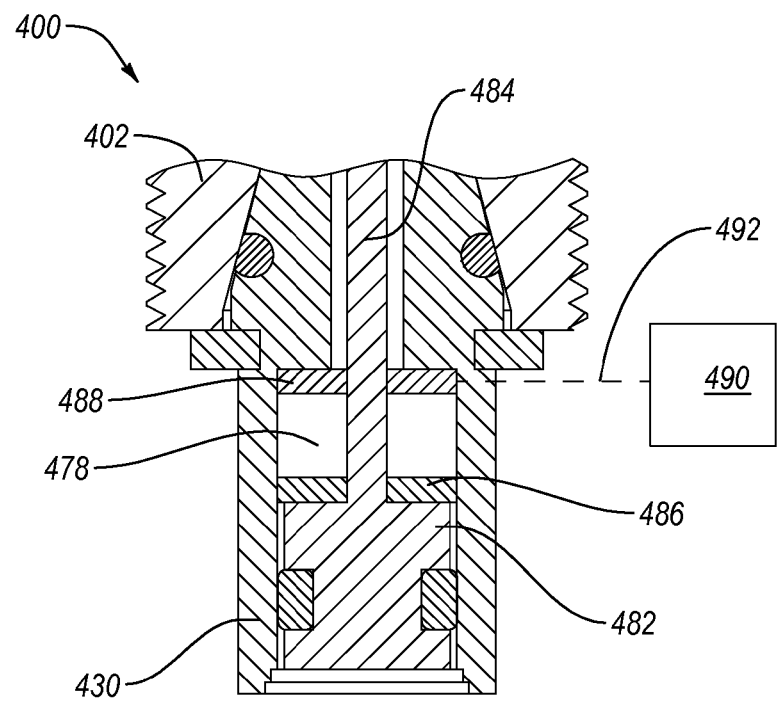
FIG. 13 is a detailed cross-sectional view of a pressure indicator in a retracted position according to an embodiment.
Figure 14:
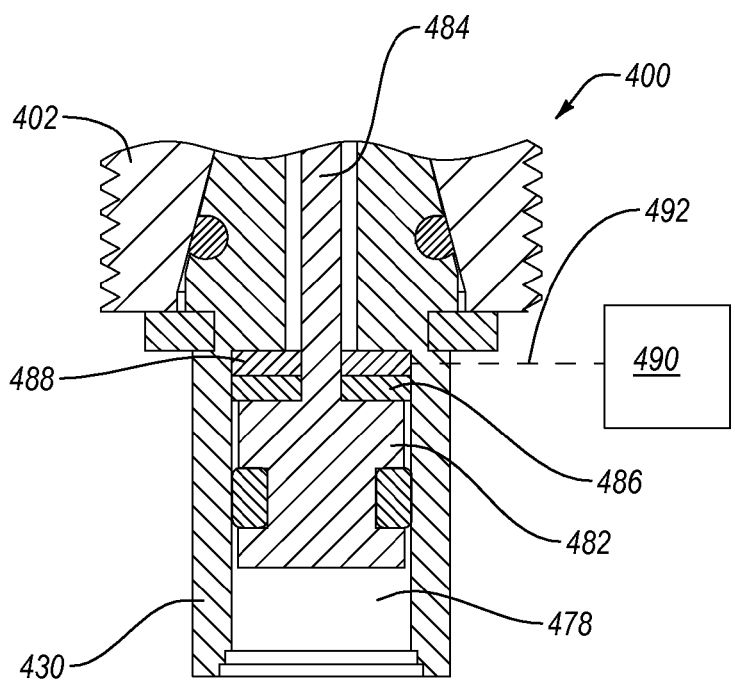
FIG. 14 is a detailed cross-sectional view of the pressure indicator in a retracted position according to an embodiment.

In some embodiments, as shown in FIGS. 13 and 14, the push portion 482 can be connected to a position-sensible element 486. A sensor 488 can be positioned within the plate receiving space 478 and used to sense the position of the position-sensible element 486. The sensor 488 can communicate with a control unit 490 to indicate the position of the indicator member 480. The position-sensible element 486 can be a magnet and the sensor 488 can be a Hall Effect Sensor. Alternatively, position-sensible element 486/sensor 488 combinations can include, but are not limited to, magnetic-reed switches, ultrasonic, and capacitive combinations. The control unit 490 can be similar to the control unit described in relation to the pressure sensor 252.

Movement of the indicator member 480 to the extended position can cause the position-sensible element 486 to move such that the sensor 488 detects the movement and sends a signal indicative of the movement to the control unit 490. In the situation that the sensor 488 detects movement of the indicator member 480, the sensor 488 may output one or more signals 492 to the control unit 490, which indicates the movement by an audio or visual alarm signal. For example, the control unit 490 may, for example, be connected to an alarm device, which is set off on detection of movement of the indicator member 480 to the extended position, which will then be an indication of a threat or danger in the pipe. The alarm device may be located in a control room, may be incorporated in a smart-phone, or may be located in any other suitable location. This has the effect of providing an early warning system to users.

FIG. 15 illustrates another embodiment of a safety isolation plug fitting 500 within the scope of the present disclosure. In this embodiment, the body 502, valve assembly 506, resilient member 510, and grip member 512 have a construction similar to body 202, valve assembly 206, resilient member 210 and grip member 212, but the plug fitting 500 has a different flow deflector 508. For instance, the flow deflector 508 includes a deflector portion 542 exhibiting a generally trapezoidal cross-section including a flat portion and pair of angled portions extending from opposite ends of the flat portion. As seen, the angled portions can extend radially away from the body 502. This advantageously can provide a wider deflection or capture area over the outlet 524, which, in turn, increases the protection of the user.

FIG. 16 illustrates still another embodiment of a safety isolation plug fitting 600 within the scope of the present disclosure. In this embodiment, body 602, valve member 606, grip member 612, and resilient member 610 have a construction similar to body 202, valve assembly 206, grip member 212, and resilient member 210, but the plug fitting 600 has a different flow deflector 608. For instance, the flow deflector 608 includes a deflector portion 642 exhibiting a concave or umbrella-like shape. The deflector portion 642 can extend over the outlet 624 and radially away from the body 602, forming a curved flow path that is generally directed back toward the pipe and to the sides of the body 602. This has the effect of dispersing the pressurized fluid exiting from the outlet 624, which, in turn, dissipates potentially dangerous energy associated with the exiting fluid.

FIG. 17 illustrates still another embodiment of a safety isolation plug fitting 700 within the scope of the present disclosure. In this embodiment, the body 702, valve assembly 706, flow deflector 708, and resilient member 710 have a construction similar to body 202, valve assembly 206, flow deflector 208, and resilient member 210, but the plug fitting 700 has a different grip member 712. For instance, the flow deflector 708 can exhibit a disc-like shape. The flow deflector 708 can include a central opening configured to receive the shaft portion 728. The upper surface of the flow deflector 708 can define a generally planar surface area that can be engaged by a user to push the valve assembly 706 into the open position. This allows for easy operation of the plug fitting 700.

As will be appreciated by one skilled in the art in view of the disclosure herein, the embodiments disclosed and learned from the review of the description provided can be used to obtain a number of features useful for application in determining whether pressurized and/or hazardous fluid remains in a pipe, tanks, hoses, and conduits, to name a few particular examples. For example, the plug fittings disclosed herein provide flow deflectors that can function as fluid redirection devices and help to move the plug fitting to a closed position. Additionally, the plug fittings can include other features that allow a user to identify and/or vent pressure and/or fluid in a piping system without having to disconnect the plug fittings from the system.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as nonexclusive. Moreover, any steps recited in any method or process claims may be executed in any order and are not limited to the order presented in the claims, unless otherwise stated in the claims. Accordingly, the scope of the invention should be determined solely by the appended claims and their legal equivalents, rather than by the descriptions and examples given above.

The invention claimed is:

1. A safety isolation plug fitting for detecting pressurized fluid in a pipe, the plug fitting comprising:
   a body defining an inlet adapted to be in fluid communication with the pipe, an outlet, and a passageway extending between said inlet and said outlet;
   a valve assembly at least partially disposed within said passageway and movable between a first extreme position and a second extreme position relative to the body, the first extreme position comprising a closed position in which fluid communication between said inlet and said outlet is inhibited, and said second extreme position comprising an open position in which a pressurized fluid from the pipe can flow between said inlet and said outlet and out of said safety isolation plug fitting, wherein fluid is inhibited from passing through said passageway when said valve assembly is in said first extreme position, said valve assembly being disposed at least partially within said passageway such that a force of the pressurized fluid urges said valve assembly toward said closed position, said valve assembly having a shaft portion that extends out of said outlet;
   a flow deflector mounted on said shaft portion of said valve assembly, said flow deflector being in fluid communication with said outlet and configured to redirect at least a portion of the pressurized fluid exiting said outlet in a direction away from a user, wherein said flow deflector is spaced apart from said body when said valve assembly is in said second extreme position, such that said outlet remains open and unobstructed by said flow deflector when said valve assembly is in said second extreme position, wherein said flow deflector is positioned further from said body when said valve assembly is in the first extreme position than when said valve assembly is in the second extreme position;
   a resilient member disposed between said outlet and said flow deflector, said resilient member being compressed between said body and said flow deflector such that said resilient member urges said valve assembly toward said closed position; and
   an external stroke adjustment mechanism mounted on said shaft portion of said valve assembly opposite the body such that said flow deflector is disposed between said body and said stroke adjustment mechanism, said stroke adjustment mechanism being adjustably mounted on said shaft portion such that said stroke adjustment mechanism can be mounted closer to or further from said body.

2. The plug fitting of claim 1, wherein said valve assembly is capable of moving from said open position toward said closed position as a result of a force of the pressurized fluid against said flow deflector.

3. The plug fitting of claim 1, wherein said flow deflector is adjustably mounted on said shaft portion of said valve assembly such that said flow deflector can be mounted closer to or further from said body, wherein:
   mounting said flow deflector closer to said body increases the compression of said resilient member and increases a force required to move said valve assembly from said closed position to said open position; and
   mounting said flow deflector further from said body decreases the compression of said resilient member and decreases the force required to move said valve assembly from said closed position to said open position.

4. The plug fitting of claim 1, wherein said valve assembly includes a head portion including a face, wherein said head portion and said shaft portion are integrally formed.

5. The plug fitting of claim 4, wherein said flow deflector is threadedly attached to said shaft portion.

6. The plug fitting of claim 5, wherein said resilient member is disposed on said shaft portion between said flow deflector and said body, said resilient member being configured to bias said flow deflector away from said body, which, in turn, biases said face toward a seat defined in said passageway.

7. The plug fitting of claim 6, wherein movement of said flow deflector toward said body compresses said resilient member between said body and said flow deflector and moves said valve assembly toward said open position.

8. The plug fitting of claim 4, further comprising a grip member threadedly attached to said shaft portion.

9. The plug fitting of claim 1, wherein said flow deflector includes a fastener portion having a threaded bore that threadedly engages said shaft portion and at least one deflector portion extending back toward said body, wherein said resilient member is partially disposed within a space defined between said fastener portion and said at least one deflector portion.

10. The plug fitting of claim 9, wherein said at least one deflector portion comprises at least one of a curved portion, an angled portion, or an arching portion.

11. The plug fitting of claim 1, wherein said valve assembly includes a pop-up indicator that moves from a retracted position when a threshold pressure within the pipe urges said pop-up indicator into an extended position in which said pop-up indicator provides a visual indication to the user that the pipe is pressurized.

12. The plug fitting of claim 11, further comprising a sensor adapted to sense movement of said pop-up indicator and report movement of said pop-up indicator to a control system.

13. The plug fitting of claim 12, wherein said pop-up indicator includes a position sensitive element.

14. The plug fitting of claim 13, wherein said position sensitive element comprises a magnet and said sensor comprises a Hall Effect sensor.

15. A residual pressure detection system comprising:
   at least one pipe;
   a safety isolation plug fitting in fluid communication with said at least one pipe and adapted to identify the presence of pressurized fluid in said at least one pipe, said plug fitting including:
      a body defining an inlet in fluid communication with said at least one pipe, an outlet, a passageway extending between said inlet and said outlet, and an internal seat disposed within said passageway;
      a valve assembly disposed at least partially within said passageway and movable between a first extreme position and a second extreme position relative to said body, the first extreme position comprising a closed position in which fluid communication between said inlet and said outlet is inhibited, and said second extreme position comprising an open position in which a pressurized fluid from said at least one pipe can flow between said inlet and said outlet and out of said safety isolation plug fitting, wherein fluid is inhibited from passing through said passageway when said valve assembly is in said first extreme position, said valve assembly being disposed at least partially within said passageway such that the pressurized fluid in said pipe urges said valve assembly toward said closed position, said valve assembly having a shaft portion that extends out of said outlet, a head portion that extends out of said inlet, and a face disposed between said shaft portion and said head portion, wherein an interface between said face and said internal seat provides a sole seal to prevent fluid from passing through said passageway and out of said plug fitting;
      a flow deflector connected to said valve assembly and in fluid communication with said outlet, said flow deflector being configured to redirect at least a portion of the pressurized fluid exiting said outlet back toward said at least one pipe and away from a user, wherein said flow deflector is spaced apart from said body when said valve assembly is in said second extreme position, such that said outlet remains open and unobstructed by said flow deflector when said valve assembly is in said second extreme position, wherein said flow deflector is positioned further from said body when said valve assembly is in the first extreme position than when said valve assembly is in the second extreme position; and
      an external stroke adjustment mechanism mounted on said shaft portion of said valve assembly opposite said body such that said flow deflector is disposed between said body and said stroke adjustment mechanism, said stroke adjustment mechanism being adjustably mounted on said shaft portion such that said stroke adjustment mechanism can be mounted closer to or further from said body, wherein:
         mounting said stroke adjustment mechanism closer to said body decreases a stroke length of said valve assembly; and
         mounting said stroke adjustment mechanism further from said body increases the stroke length of said valve assembly.

16. The system of claim 15, wherein said at least one pipe comprises at least one of an oil pipe, a gas pipe, a vapor pipe, an air pipe, a pressurized pipe, a pressure tank or a pressure vessel.

17. The system of claim 15, further comprising a resilient member operatively attached to said valve member and adapted to bias said valve assembly toward said closed position.

18. A method of detecting pressurized fluid in a pipe, the method comprising:
   attaching a safety isolation plug fitting to the pipe, said plug fitting comprising:
      a body defining an inlet adapted to be in fluid communication with a pipe, an outlet, and a passageway extending between said inlet and said outlet;
      a valve assembly disposed at least partially within said passageway and movable between a first extreme position and a second extreme position relative to the body, the first extreme position comprising a closed position in which fluid communication between said inlet and said outlet is inhibited, and said second extreme position comprising an open position in which pressurized fluid in the pipe can flow between said inlet and said outlet and out of said safety isolation plug fitting, wherein fluid is inhibited from passing through said passageway only when said valve assembly is in said first extreme position, said valve assembly being disposed at least partially within said passageway such that the pressurized fluid from the pipe urges said valve assembly toward said closed position, said valve assembly having a shaft portion that extends out of said outlet;

a flow deflector adjustably mounted on said shaft portion of said valve assembly and in fluid communication with said outlet, wherein said flow deflector is spaced apart from said body when said valve assembly is in said second extreme position, such that said outlet remains open and unobstructed by said flow deflector when said valve assembly is in said second extreme position, wherein said flow deflector is positioned further from the body when the valve assembly is in the first extreme position than when the valve assembly is in the second extreme position;

a resilient member disposed between said outlet and said flow deflector, said resilient member being compressed between said body and said flow deflector such that said resilient member urges said valve assembly toward said closed position; and an external stroke adjustment mechanism mounted on said shaft portion of said valve assembly opposite said body such that said flow deflector is disposed between said body and said stroke adjustment mechanism, said stroke adjustment mechanism being adjustably mounted on said shaft portion such that said stroke adjustment mechanism can be mounted closer to or further from said body to selectively adjust a stroke length of said valve assembly;

adjusting the position of said flow deflector on said shaft portion to alter the compression of said resilient member to vary a force required to move said valve assembly from said closed position to said open position;

adjusting the position of said stroke adjustment mechanism on said shaft portion to alter the stroke length of said valve assembly while said safety isolation plug fitting is attached to the pipe; and selectively moving said valve assembly from said closed position to said open position to see if any pressurized fluid exits from said outlet and is caught by said flow deflector and redirected back toward the pipe by said flow deflector, selectively moving said valve assembly from said closed position to said open position comprising applying an external force to said valve assembly to overcome a force of the pressurized fluid from the pipe.

19. The method of claim 18, wherein moving said valve assembly to said open position includes tapping said valve assembly one or more times.

20. The method of claim 18, further comprising moving said valve assembly from said open position to said closed position by removing said external force.

21. The method of claim 18, wherein the force of the pressurized fluid against said flow deflector moves said valve assembly from said open position toward said closed position.

* * * * *